US007496498B2

(12) United States Patent
Chu et al.

(10) Patent No.: US 7,496,498 B2
(45) Date of Patent: Feb. 24, 2009

(54) FRONT-END ARCHITECTURE FOR A MULTI-LINGUAL TEXT-TO-SPEECH SYSTEM

(75) Inventors: Min Chu, Beijing (CN); Hu Peng, Beijing (CN); Yong Zhao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/396,944

(22) Filed: Mar. 24, 2003

(65) Prior Publication Data

US 2004/0193398 A1 Sep. 30, 2004

(51) Int. Cl.

| | |
|---|---|
| ***G06F 17/20*** | (2006.01) |
| ***G06F 17/28*** | (2006.01) |
| ***G10L 11/00*** | (2006.01) |
| ***G10L 13/08*** | (2006.01) |
| ***G10L 21/00*** | (2006.01) |

(52) U.S. Cl. .................. 704/4; 704/2; 704/3; 704/260; 704/270; 704/277; 715/560

(58) Field of Classification Search ................ 704/260, 704/4

See application file for complete search history.

(56) References Cited

U.S. PATENT DOCUMENTS

| | | | | |
|---|---|---|---|---|
| 4,718,094 A | | 1/1988 | Bahl | 381/43 |
| 5,146,405 A | | 9/1992 | Church | 704/9 |
| 5,384,893 A | * | 1/1995 | Hutchins | 704/267 |
| 5,440,481 A | | 8/1995 | Kostoff | 364/999.999 |
| 5,592,585 A | | 1/1997 | Van Coile et al. | 704/206 |
| 5,727,120 A | | 3/1998 | Van Coile et al. | 704/206 |
| 5,732,395 A | | 3/1998 | Alexander Silverman | 704/260 |
| 5,839,105 A | | 11/1998 | Ostendorf et al. | 704/256 |
| 5,857,169 A | | 1/1999 | Seide | 704/256 |
| 5,890,117 A | | 3/1999 | Silverman | 704/260 |
| 5,905,972 A | | 5/1999 | Huang et al. | 704/268 |
| 5,912,989 A | | 6/1999 | Watanabe | 382/228 |
| 5,933,806 A | | 8/1999 | Beyerlein | 704/256 |

(Continued)

FOREIGN PATENT DOCUMENTS

| | | |
|---|---|---|
| EP | 0 984 426 | 3/2000 |

(Continued)

OTHER PUBLICATIONS

Huang X et al., "Recent Improvements on Microsoft's Trainable Text-To-Speech System-Whistler," Acoustics, Speech and Signal Processing, 1997, pp. 959-962.

(Continued)

*Primary Examiner*—David R Hudspeth
*Assistant Examiner*—Justin W Rider
(74) *Attorney, Agent, or Firm*—Steven M. Koehler; Westman, Champlin & Kelly, P.A.

(57) ABSTRACT

A text processing system for processing multi-lingual text for a speech synthesizer includes a first language dependent module for performing at least one of text and prosody analysis on a portion of input text comprising a first language. A second language dependent module performs at least one of text and prosody analysis on a second portion of input text comprising a second language. A third module is adapted to receive outputs from the first and second dependent module and performs prosodic and phonetic context abstraction over the outputs based on multi-lingual text.

23 Claims, 7 Drawing Sheets

U.S. PATENT DOCUMENTS

| | | | | | |
|---|---|---|---|---|---|
| 5,937,422 | A | | 8/1999 | Nelson | 707/531 |
| 6,064,960 | A | | 5/2000 | Bellegarda et al. | |
| 6,076,060 | A | | 6/2000 | Lin et al. | 704/260 |
| 6,101,470 | A | | 8/2000 | Eide et al. | 704/260 |
| 6,141,642 | A | * | 10/2000 | Oh | 704/260 |
| 6,151,576 | A | * | 11/2000 | Warnock et al. | 704/260 |
| 6,172,675 | B1 | | 1/2001 | Ahmad | 345/328 |
| 6,185,533 | B1 | | 2/2001 | Holm et al. | 704/267 |
| 6,230,131 | B1 | | 5/2001 | Kuhn et al. | 704/266 |
| 6,401,060 | B1 | | 6/2002 | Critchlow et al. | 704/1 |
| 6,499,014 | B1 | | 12/2002 | Chihara | 704/260 |
| 6,505,158 | B1 | | 1/2003 | Conkie | |
| 6,665,641 | B1 | | 12/2003 | Coorman et al. | 704/260 |
| 6,708,152 | B2 | | 3/2004 | Kivimaki | 704/260 |
| 6,751,592 | B1 | | 6/2004 | Shiga | 704/258 |
| 6,829,578 | B1 | | 12/2004 | Huang et al. | 704/211 |
| 6,978,239 | B2 | | 12/2005 | Chu et al. | |
| 7,010,489 | B1 | | 3/2006 | Lewis et al. | 704/260 |
| 2002/0072908 | A1 | | 6/2002 | Case et al. | 704/260 |
| 2002/0103648 | A1 | | 8/2002 | Case et al. | 704/260 |
| 2002/0152073 | A1 | * | 10/2002 | DeMoortel et al. | 704/260 |
| 2003/0208355 | A1 | * | 11/2003 | Stylianou et al. | 704/207 |

FOREIGN PATENT DOCUMENTS

| | | |
|---|---|---|
| EP | 1213705 | 6/2002 |

OTHER PUBLICATIONS

Hunt A et al., "Unit Selection in a Concatenative Speech Synthesis System Using a Large Speech Database," IEEE International Conference on Acoustics, Speech and Signal Processing, 1996, pp. 373-376.

Tien Ying Fung et al., "Concatenating Syllables for Response Generation in Spoken Language Applications," IEEE International Conference on Acoustics, Speech and Signal Processing, 2000, pp. 933-936.

Fu-Chiang Chou et al., "A Chinese Text-To-Speech System Based on Part-of-Speech Analysis, Prosodic Modeling and Non-Uniform Units," Acoustics, Speech, and Signal Processing, 1997, pp. 923-926.

Bigorgne D. et al., "Multilingual PSOLA Text-To-Speech System," Statistical Signal and Array Processing, Proceedings of the International Conference on Acoustics, Speech, and Signal Processing, 1993, pp. 187-190.

Nakajima S et al., "Automatic Generation of Synthesis Units Based on Context Oriented Clustering," International Conference on Acoustics, Speech and Signal Processing, 1988, pp. 659-662.

Black A W et al. "Optimising Selection of Units from Speech Databases for Concatenative Synthesis," 4th European Conference on Speech Communication and Technology Eurospeech, 1995, pp. 581-584.

P.B. Mareuil and B. Soulage, "Input/output normalization and linguistic analysis for a multilingual text-to-speech Synthesis System," Proc. of 4th ISCA workshop on speech synthesis, Scotland, 2001.

http;//www.research.att.com/projects/tts/, copyright 2003.

D.H. Klatt, "The Klattalk text-to-speech conversion system," Proc. of ICASSP '82, pp. 1589-1592, 1982.

H. Fujisaki, K. Hirose, N. Takahashi and H. Morikawa, "Acoustic characteristics and the underlying rules of intonation of the common Japanese used by radio and TV announcers," *Proc. of ICASSP* '86, pp. 2039-2042, 1986.

K.N. Ross and M. Ostendorf, "A dynamical system model for generating fundamental frequency for speech synthesis," IEEE transactions on speech and audio processing, vol. 7, No. 3, pp. 295-309, 1999.

J.R. Bellegarda, K. Silverman, K. Lenzo, and V. Anderson, "Statistical prosodic modeling: from corpus design to parameter estimation," IEEE transactions on speech and audio processing, vol. 9, No. 1, pp. 52-66, 2001.

S. Chen, S. Hwang and Y. Wang, "An RNN-based prosodic information synthesizer for Mandarin text-to-speech," IEEE transactions on speech and audio processing, vol. 6, No. 3, pp. 226-239, 1998.

M. Chu, H. Peng, H. Yang and E. Chang, "Selecting non-uniform units from a very large corpus for concatenative speech synthesizer," *Proc. of ICASSP* '2001, Salt Lake City, 2001.

E. Moulines and F. Charpentier, "Pitch-Synchronous Waveform Processing Techniques for Text-to-Speech Synthesis Using Diphones," Speech Communication vol. 9, pp. 453-467, 1990.

Y. Stylianou, T. Dutoit, and J. Schroeter, "Diphone concatenation using a harmonic plus noise model of speech," Proc. of Eurospeech '97, pp. 613-616, Rhodes, 1997.

X.D. Huang, A. Acero, J. Adcock, et al., "Whistler: a trainable text-to-speech system," Proc. of 'ICSLP '96, Philadelphia, 1996.

R.E. Donovan and E.M. Eide, "The IBM trainable speech synthesis system," Proc. of ICSLP '98, Sidney, 1998.

H. Peng, Y. Zhao and M. Chu, "Perpetually optimizing the cost function for unit selection in a TTS system with one single run of MOS evaluation," Proc. of ICSLP '2002, Denver, 2002.

M. Chu and H. Peng, "An objective measure for estimating MOS of synthesized speech," Proc. of Eurospeech '2001, Aalborg, 2001.

http://www.microsoft.com/speech/techinfo/compliance/, Apr. 3, 2002.

Wang, et al. "Tree-Based Unit Selection for English Speech Synthesis," ICASSP '93, vol. 2, pp. 191-194 (1993).

Huang, X., Lou, Z. and Tang, J., "A Quick Method for Chinese Word Segmentation," Intelligent Processing Systems, vol. 2, pp. 1773-1776 (1997).

Wong, P. and Chan, C., "Chinese Word Segmentation Based on Maximum Matching and Word Binding Force," Coling'96, Copenhagen (1996).

Hon, H., Acero, A., Huang, S., Liu, J. and Plumpe, M., "Automated Generation of Synthesis Units for Trainable Text-to-Speech Systems," ICASSP'98, vol. 1, pp. 293-296 (1998).

Black, A. and Campbell, N., "Unit Selection in a Concatentaive Speech Synthesis System Using a Large Speech Database," ICASSP'96, pp. 373-376 (1996).

Chu, M., Tang, D., Si, H., Tian, Z. and Lu, S., "Research on Perception of Junction Between Syllables in Chinese," Chinese Journal of Acoustics, vol. 17, No. 2, pp. 143-152.

M. Chu, H. Peng and E. Chang, "A concatenative Mandarin TTS system without prosody model and prosody modification", Proceedings of 4th ISCA workshop on speech synthesis, Scotland, 2001.

Campbell, Nick: "Foreign-Language Speech Synthesis" Proceedings 3rd Esca-Cocosda Int'l Workshop In Speech Synthesis, Nov. 26, 1998, pp. 177-180.

Campbell, Nick: "Talking Foreign Concatenative Speech Synthesis and the Language Barrier", Eurospeech 2001, vol. 1, 2001. p. 337.

Sproat et al: "Emu: an e-mail preprocessor for text-to-speech" Multimedia Signal Processing, 1998 IEEE Second Workshop on Redondo Beach, CA, Dec. 7-9, 1998.

Sproat R Ed, et al., "Multilingual text analysis for text-to-speech synthesis", Spoken Language, 1996. ICSLP 96 Proceedings, 4th International Conference in Philadelphia, PA, Oct. 3-6, 1996, pp. 1365-1368.

Christof Traber et al., "From Multilingual To Polyglot Speech Synthesis" Eurospeech 1999, vol. 2, 1999, p. 835.

Huber, H. et al., "Possy: EIN Projekt Zur Realisierung Einer Polyglotten Sprachsynthese" In Daga-Tagungsband, 1998, pp. 392-393.

Min Chu, Hu Peng, Yong Zhao, Zhengyu Niu and Eric Chang, Microsoft Mulan—a Bilingual TTS System, in Proc. of ICASSP2003, Hong Kong, 2003.

Submitted herewith is a copy of an Offical Search Report of the European Patent Office in counterpart foreign application No. 04006985.8 filed Mar. 23, 2004.

* cited by examiner

FRONT-END ARCHITECTURE FOR A MULTI-LINGUAL TEXT-TO-SPEECH SYSTEM

BACKGROUND OF THE INVENTION

The present invention relates to speech synthesis. In particular, the present invention relates to a multi-lingual speech synthesis system.

Text-to-speech systems have been developed to allow computerized systems to communicate with users through synthesized speech. Some applications include spoken dialog systems, call center services, voice-enabled web and e-mail services, to name a few. Although text-to-speech systems have improved over the past few years, some shortcomings still exist. For instance, many text-to-speech systems are designed for only a single language. However, there are many applications that need a system that can provide speech synthesis of words from multiple languages, and in particular, speech synthesis where words from two or more languages are contained in the same sentence.

Systems, that have been developed to provide speech synthesis for utterances having words from multiple languages, use separate text-to-speech engines to synthesize words from each respective language of the utterance, each engine generating waveforms for the synthesized words. The waveforms are then joined or otherwise outputted successively in order to synthesize the complete utterance. The main drawback of this approach is that voices coming out of the two engines usually sound different. Users are commonly annoyed when hearing such voice utterances, because it appears that two different speakers are speaking. In addition, overall sentence intonation is destroyed, which impairs comprehension.

Accordingly, a system for multi-lingual speech synthesis that addresses at least some of the foregoing disadvantages would be beneficial and improve multi-lingual speech synthesis.

SUMMARY OF THE INVENTION

A text processing system for a speech synthesis system receives input text comprising a mixture of at least two languages and provides an output that is suitable for use by a back-end portion of a speech synthesizer. Generally, the text processing system includes language-independent modules and language-dependent modules that perform text processing. This architecture has the advantage of smooth switching between languages and maintaining fluent intonation for mixed-lingual sentences.

DETAILED DESCRIPTION OF ILLUSTRATIVE EMBODIMENTS

Figure 1:
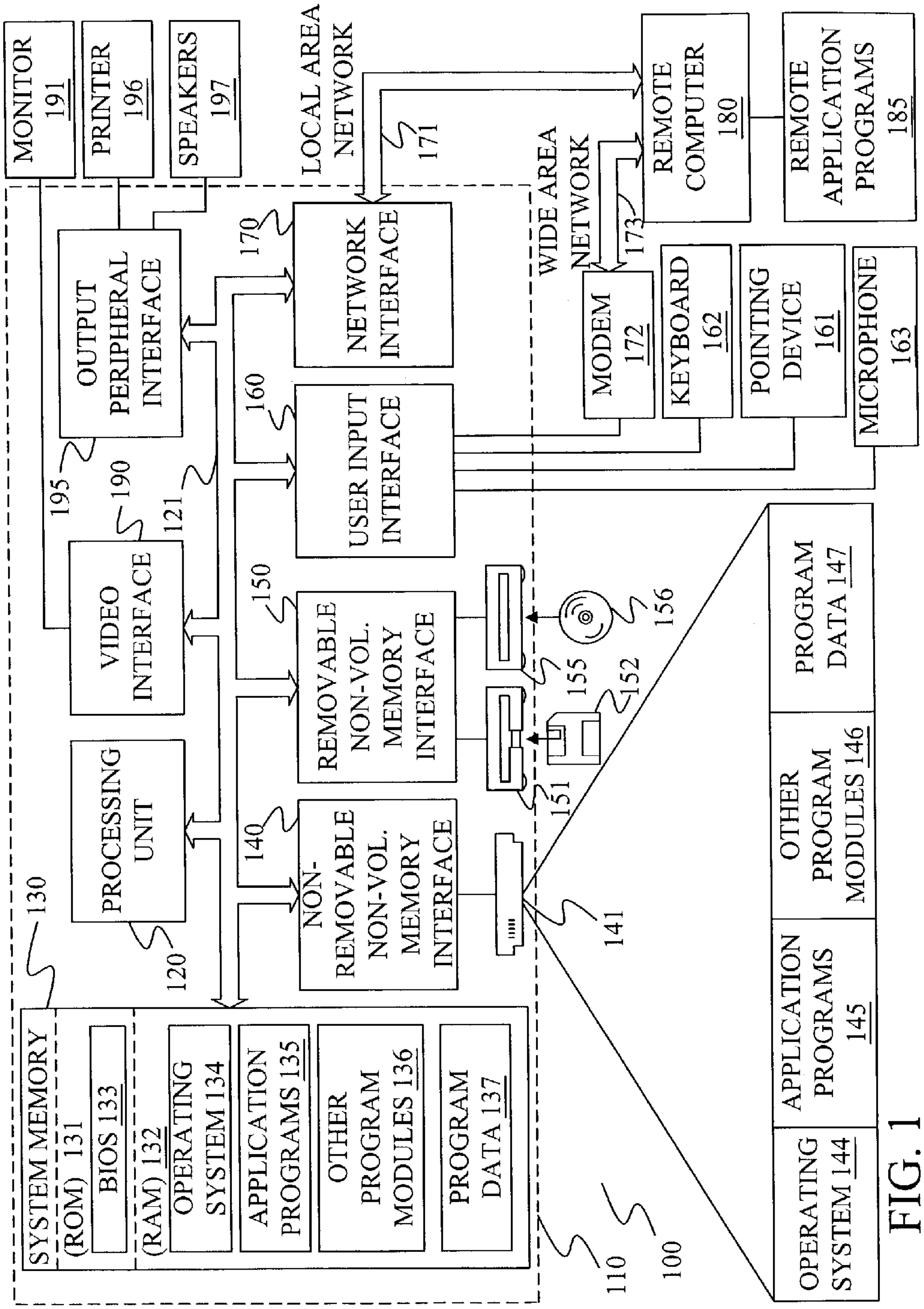
FIG. 1 is a block diagram of a general computing environment in which the present invention can be practiced.

Before describing aspects of the present invention, it may be helpful to first describe exemplary computer environments for the invention. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures herein as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
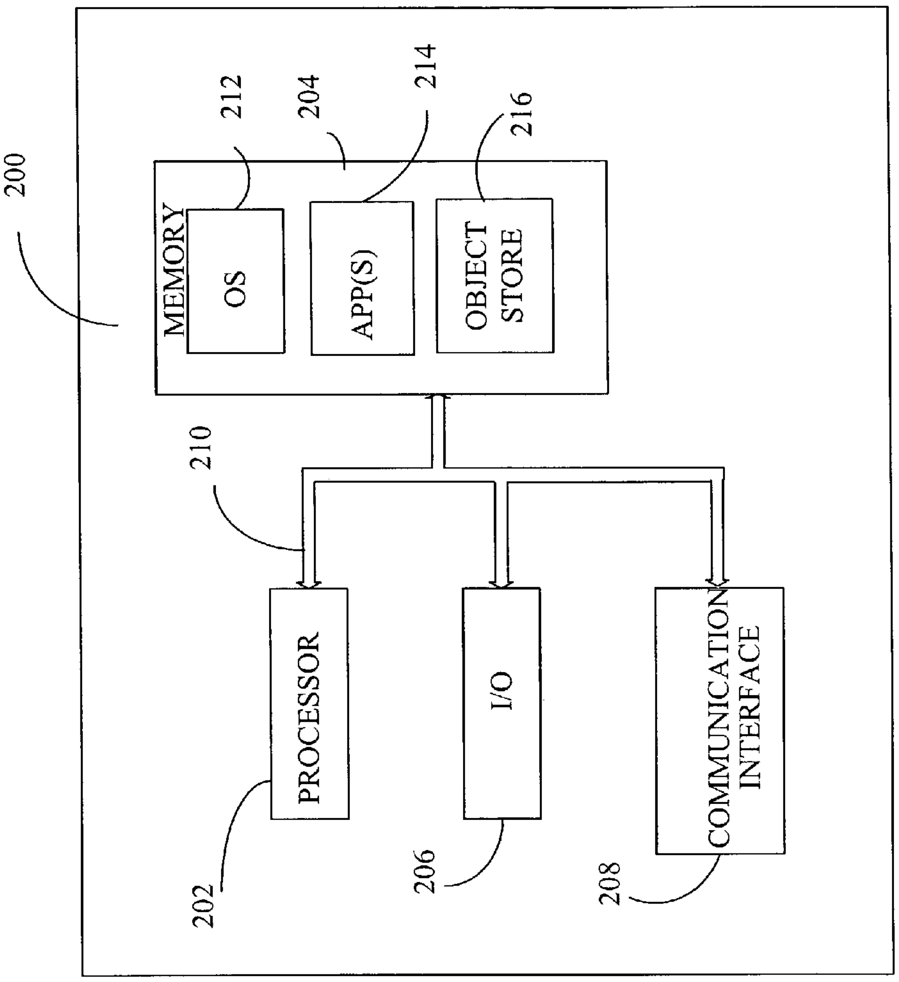
FIG. 2 is a block diagram of a mobile device in which the present invention can be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3A:
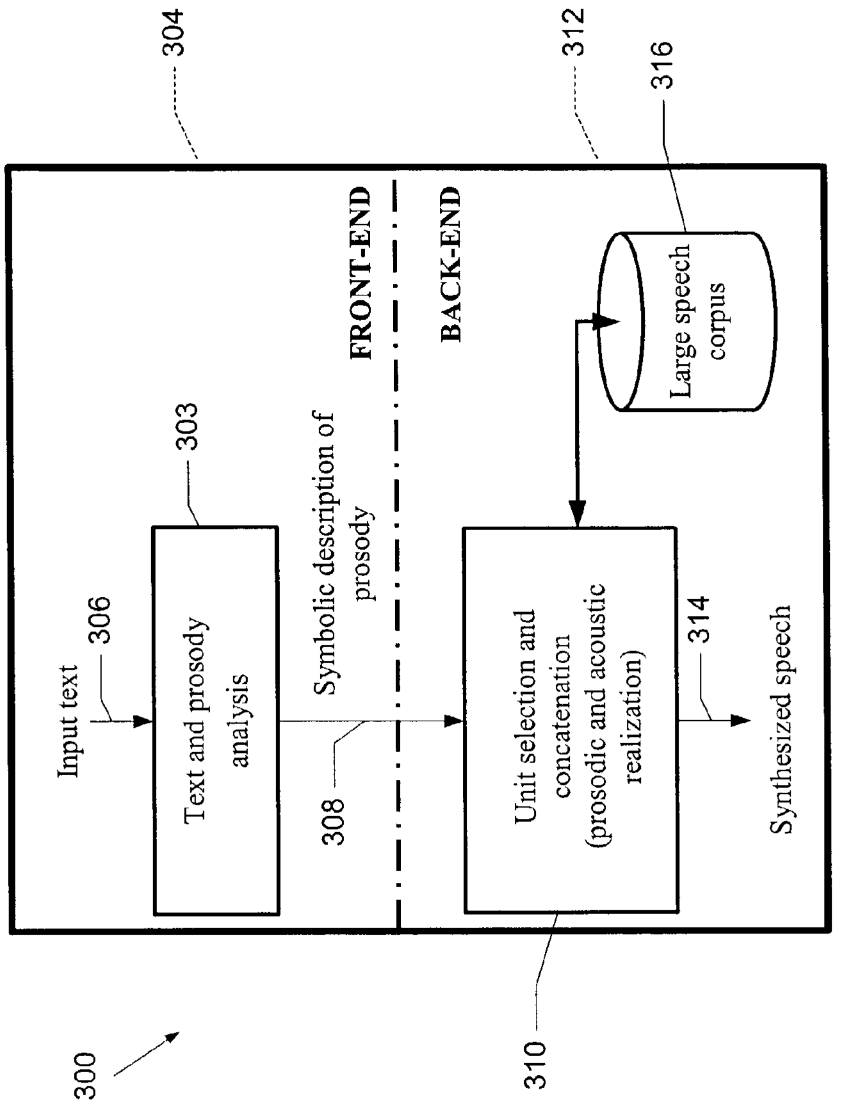
FIG. 3A PRIOR ART
FIG. 3A is a block diagram of a first embodiment of a prior art speech synthesis system.
Figure 3B:
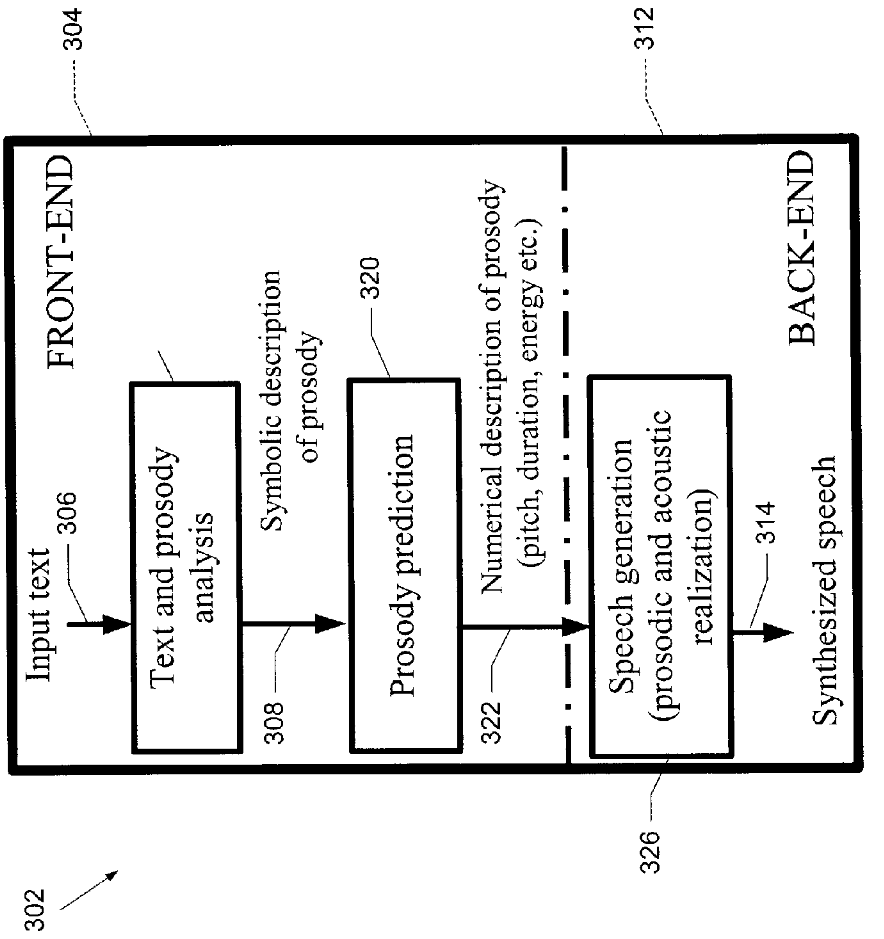
FIG. 3B PRIOR ART
FIG. 3B is a block diagram of a second embodiment of a prior art speech synthesis system.

To further help understand the present invention, it may be helpful to provide a brief description of current speech synthesizers or engines 300 and 302, which are illustrated in FIGS. 3A and 3B, respectively. Referring first to FIG. 3A, speech synthesizer 300 includes a front-end portion or text processing system 304 that generally processes input text received at 306 and performs text analysis and prosody analysis with module 303. An output 308 of module 303 comprises a symbolic description of prosody for the input text 306. Output 308 is provided to a unit selection and concatenation module 310 in a back-end portion or synthesis module 312 of engine 300. Unit selection and concatenation module 310 generates a synthesized speech waveform 314 using a stored corpus 316 of sampled speech units. Synthesized speech waveform 314 is generated by directly concatenating speech units, typically without any pitch or duration modification under the assumption that the speech corpus 316 contains enough prosodic and spectral varieties for all synthetic units and that the suitable segment can always be found.

Speech synthesizer 302 also includes the text and prosody analysis module 303 that receives the input text 306 and provides a symbolic description of prosody at output 308. However, as illustrated, front-end portion 304 also includes a prosody prediction module 320 that receives the symbolic description of prosody 308 and provides a numerical description of prosody at output 322. As is known, prosody prediction module 320 takes some high-level prosodic constraints, such as part-of-speech, phrasing, accent and emphasizes, etc., as input and makes predictions on pitch, duration, energy, etc., generating deterministic values for them that comprise output 322. Output 322 is provided to back-end portion 312, which in this form comprises a speech generation module 326 that generates the synthesized speech waveform 314, which has prosody features matching the numerical description of prosody input 322. This can be achieved by setting corresponding parameters in a formant based or LPC based back-end or by applying prosody scaling algorithms such as PSOLA or HNM in a concatenative back-end.

Figure 3C:
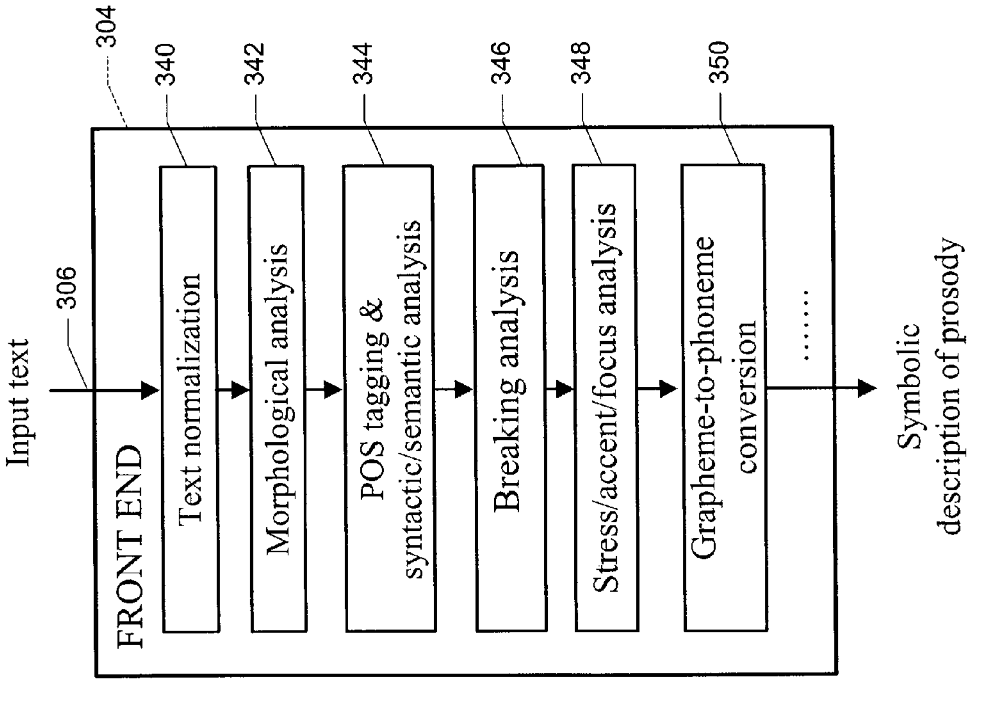
FIG. 3C PRIOR ART
FIG. 3C. is a block diagram of a front-end portion of a prior art speech synthesis system.

FIG. 3C illustrates various modules that can form the text and prosody analysis module 303 in front-end portion 304 of speech synthesizer 300 and 302, providing a symbolic description of prosody 308. Typical processing modules include a text normalization module 340 that receives the input text 306 and converts symbols such as currency, dates or other portions of the input text 306 into readable words.

Upon normalization, a morphological analysis module 342 can be used to perform morphological analysis to ascertain plurals, past tense, etc. in the input text. Syntactic/semantic analysis can then be performed by module 344 to identify parts of speech (POS) of the words or to predict syntactic/semantic structure of sentences, if necessary. Further processing can then be performed if desired by module 346 that groups the words into phrases according to the input from module 344 (i.e., the POS tagging or syntactic/semantic structure) or simply by commas, periods, etc. Semantic features including stress, accent, and/or focus are predicted by module 348. Grapheme-to-phoneme conversion module 350 converts the words to phonetic symbols corresponding to proper pronunciation. The output of 303 is the phonetic unit strings with symbolic description of prosody 308.

It should be emphasized that the modules forming text and prosody analysis portion 303 are merely illustrative and are included as necessary to generate the desired output from front-end portion 304 to be used by the back-end portion 312 illustrated in FIGS. 3A or 3B.

For multi-lingual text, a speech engine 300 or 302 would be provided for each language of the text to be synthesized. Portions corresponding to each separate language in the text would be provided to the respective single-language speech synthesizer, and processed separately, wherein the outputs 314 would be joined or otherwise successively outputted using suitable hardware. As discussed in the background section, disadvantages include loss of overall sentence intonation and portions of a single sentence appearing to emanate from two or more different speakers.

Figure 4:
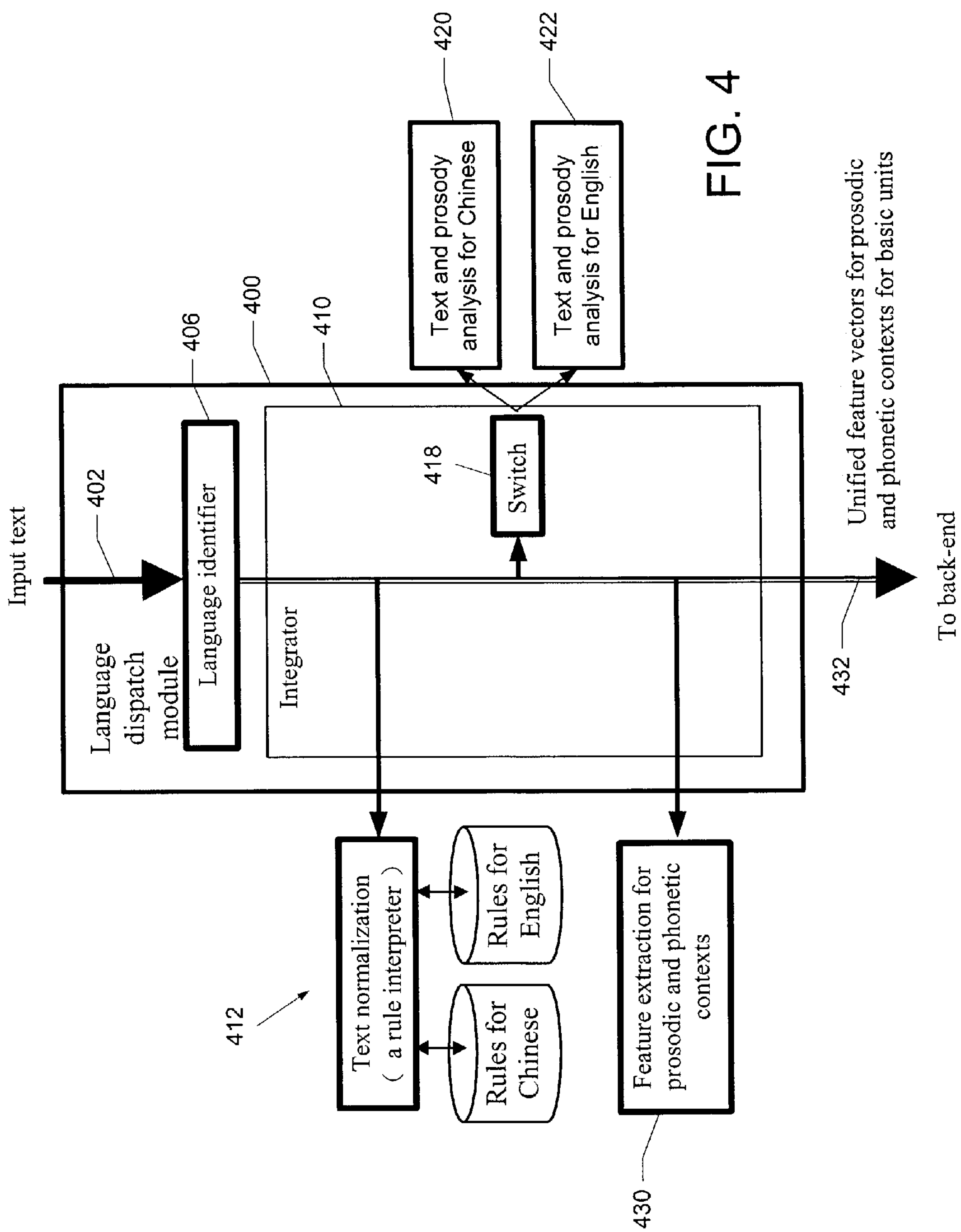
FIG. 4 is a block diagram of a first embodiment of the present invention comprising a text processing system for a speech synthesizer.

FIG. 4 illustrates a first exemplary embodiment of a text and prosody analysis system 400 for a speech synthesis system that receives an input text 402 comprising sentences of one language or a mixture of at least two languages and provides an output 432 that is suitable for use by a back-end portion of a speech synthesizer, commonly of the form as illustrated in FIGS. 3A or 3B. Generally, the front-end portion 400 includes language-independent modules and language-dependent modules that perform the desired functions illustrated in FIG. 3C. This architecture has the advantage of smooth switching between languages and maintaining fluent intonation for mixed-lingual sentences. In FIG. 4, the method of processing flows from top to bottom.

In the illustrative embodiment, the text and prosody analysis portion 400 contains a language dispatch module that includes a language identifier module 406 and an integrator. The language identifier module 406 receives the input text 402 and includes or associates language identifiers (Ids) or tags to sentences and/or words denoting them appropriately for the language they are used in. In the example illustrated, Chinese characters and English characters use very distinctly different codes to form the input text 402, thus it is relatively easy to identify that part of the input text 402 corresponding to Chinese or corresponding to English. For languages such as French, German or Spanish where common characters may be present in each of the languages, further processing may be needed.

The input text having appropriate language identifiers is then provided to an integrator module 410. Generally, the integrator module 410 manages data flow between the language-independent and language-dependent modules and maintains a unified data flow to ensure appropriate processing upon receipt of the output from each of the modules. Typically, the integrator module 410 first passes the input text having language identifiers to a text-normalization module 412. In the embodiment illustrated, the text-normalization module 412 is a language independent rule interpreter. The module 412 includes two components. One is a pattern identifier, while the other is a pattern interpreter, which converts a matching pattern into a readable text string according to rules. Each rule has two parts, the first part is a definition of a pattern, while the other is the converting rule for the pattern. The definition part can either be shared by both languages or be specified to one of them. The converting rules are typically language specific. If a new language is added, the rule interpreting module does not need to be changed, only new rules for the new language need be added. As appreciated by those skilled in the art, the text-normalization module 412 could precede the language identifier module 410 if appropriate processing is provided in the text-normalization module 412 to identify each of the language words in the input text.

Upon receipt of the output from the text- normalization module 412, the integrator 410 forwards appropriate words and/or phrases for text and prosody analysis to the appropriate language-dependent module. In the illustrated example, a Chinese Mandarin module 420 and an English module 422 are provided. The Chinese module 420 and the English module 422 deal with all language specific processes such as phrasing and grapheme-to-phoneme conversion for both languages, word segmentation for Chinese and abbreviation expansion for English, to name a few. In FIG. 4, a switch 418 schematically illustrates the function of the integrator 410 in forwarding portions of the input text to the appropriate language-dependent module as denoted by the language identifiers.

In addition to language identifiers, the segments of the input text 402 may include or have associated therewith identifiers denoting their position in the input text 402 such that upon receipt of the outputs from the various language-independent and language-dependent modules, the integrator 410 can reconstruct the proper order of the segments, since not all segments are processed by the same modules. This allows parallel processing and thus faster processing of the input text 402. Of course, processing of the input text 402 can be segment by segment in the order as found in the input text 402.

The outputs from the language-dependent modules are then processed by a unified feature extraction module 430 for prosody and phonetic context. In this manner, overall sentence intonation is not lost since the prosodic and phonetic context will be analyzed for the entire sentence after text and prosody analysis by modules 420 and 422 for Chinese and English segments as appropriate. In the illustrated embodiment, an output 432 of the text and prosody analysis portion 400 is a sequential unit list (including units in both English and Mandarin) with unified feature vectors that include prosodic and phonetic context. Unit concatenation can then be provided in the back-end portion such as illustrated in FIG. 3A, an illustrative embodiment of which is described further below. Alternatively, if desired, text and prosody analysis portion 400 can be attached with an appropriate language-independent module to perform prosody prediction (similar to module 320) and provide a numerical description of prosody as an output. Then the numerical description of prosody can be provided to the back-end portion 312 as illustrated in FIG. 3B.

Figure 5:
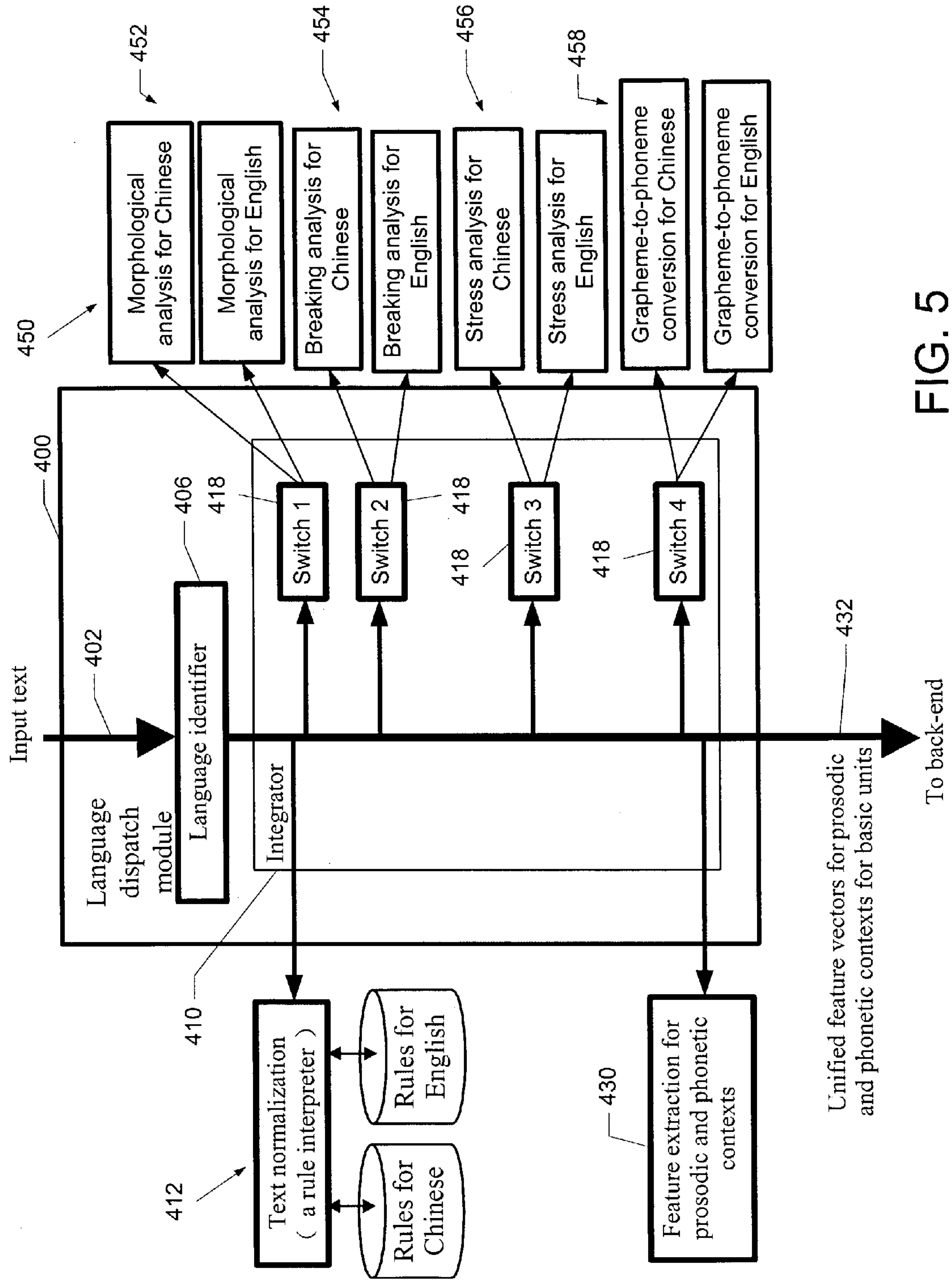
FIG. 5 is a block diagram of a second embodiment of the present invention comprising a text processing system for a speech synthesizer.

FIG. 5 illustrates another exemplary embodiment of a bilingual text and prosody analysis system 450 of the present invention in which text and prosody analysis are organized into four exemplary stand-alone modules comprising morphological analysis 452, breaking analysis 454, stress/accent analysis 456 and grapheme-to-phoneme conversion 458. Each of these functions have two modules supporting English and Mandarin, respectively. Like FIG. 4, the order of processing on input text flows from top to bottom in the figure. Although illustrated with two languages English and Mandarin, it should be apparent that the architecture of the text and prosody analysis portion 400, 450 can be easily adapted to accommodate as many languages as desired. In addition, it should be noted that other language-dependent modules and/or language independent modules can be easily integrated in the text processing system architecture as desired.

In one embodiment, the back-end portion 312 can take the form as illustrated in FIG. 3A where unit concatenation is provided. For a multi-lingual system comprising Mandarin Chinese and English, the syllable is the smallest unit for Mandarin Chinese and the phoneme is the smallest unit for English. The unit selecting algorithm should pick out a series of segments from the prosodically reasonable pools of unit candidates to achieve natural or comfortable splicing as much as possible. Seven prosodic constraints can be considered. They include position in phrase, position in word, position in syllable, left tone, right tone, accent level in word, and emphasis level in phrase. Among them, position in syllable and accent level in word are effective only in English and right/left tone are effective only for Mandarin.

All instances for a base unit are clustered using a CART (Classification and Regression Tree) by querying about the prosodic constraints. The splitting criterion for CART is to maximize reduction in the weighted sum of the MSEs (Mean Squared Error) of the three features: the average $f_0$, the dynamic range of $f_0$, and the duration. The MSE of each feature is defined as the mean of the square distances from the feature values of all instances to the mean value of their host leaves. After the trees are grown, instances on the same leaf node have similar prosodic features. Two phonetic constraints, the left and right phonetic context and a smoothness cost are used to assure the continuity of the concatenation between the units. Concatenative cost is defined as the weighted sum of the source-target distances of the seven prosodic constraints, the two phonetic constraints and the smoothness cost. The distance table for each prosodic/phonetic constraint and the weights for all components are first assigned manually and then tuned automatically with the method presented in "Perpetually optimizing the cost function for unit selection in a TTS system for one single run of MOS evaluation", Proc. of ICSLP'2002, Denver, by H. Peng, Y. Zhao and M. Chu. When synthesizing an utterance, prosodic constraints are first used to find a cluster of instances (a leaf node in the CART tree) for each unit, then, a Viterbi search is used to find the best instance for each unit that will generate the smallest overall concatenative cost. The selected segments are then concatenated one by one to form a synthetic utterance. Preferably, the corpus of units is obtained from a single bilingual speaker. Although the two languages adopt units of different size, they share the same unit selection algorithm and the same set of features for units. Therefore, the back-end portion of the speech synthesizer can process unit sequences in a single language or a mixture of the two languages. Selection of unit instances in accordance with that described above is described in greater detail in U.S. patent application Ser. No. 20020099547A1, entitled "Method and Apparatus for Speech Synthesis Without Prosody Modification" and published Jul. 25, 2002, the content of which is hereby incorporated by reference in its entirety.

Although the present invention has been described with reference to particular embodiments, workers skilled in the art will recognize that changes may be made in form and detail without departing from the spirit and scope of the invention.

What is claimed is:

1. A text processing system for processing a sentence of multi-lingual text for a speech synthesizer, the text processing system comprising:

a database having sampled speech units of a first language and of a second language;

a first language dependent module for performing at least one of text and prosody analysis on a first portion of the sentence comprising the first language;

a second language dependent module for performing at least one of text and prosody analysis on a second portion of the sentence comprising the second language;

a third module adapted to receive outputs from the first and second language dependent modules and perform prosodic and phonetic context modification over the outputs based on an intonation for the entire sentence, the third module generating an output sentence; and a speech unit concatenation module for receiving the output sentence, selecting speech units from the database corresponding to the output sentence, and concatenating the speech units to form an utterance of the output sentence.

2. The text processing system of claim 1 and further comprising a text normalization module for normalizing text for processing by the first language dependent module and the second language dependent module.

3. The text processing system of claim 1 and further comprising a language identifier module adapted to receive multi-lingual text and associate identifiers for portions comprising the first language and for portions comprising the second language.

4. The text processing system of claim 3 and further comprising an integrator module adapted to receive outputs from each module and forward said outputs for processing to another module as appropriate.

5. The text processing system of claim 4 wherein the integrator forwards said outputs to the first language dependent module and the second language dependent module as a function of associated identifiers.

6. The text processing system of claim 5 wherein the first language dependent module and the second language dependent module are adapted to perform morphological analysis.

7. The text processing system of claim 5 wherein the first language dependent module and the second language dependent module are adapted to perform breaking analysis.

8. The text processing system of claim 5 wherein the first language dependent module and the second language dependent module are adapted to perform stress analysis.

9. The text processing system of claim 5 wherein the first language dependent module and the second language dependent module are adapted to perform grapheme-to-phoneme conversion.

10. A method for text processing of multi-lingual text for a speech synthesizer, the method comprising:

storing in a database sampled speech units of a first language and of a second language;

receiving input text forming a sentence and identifying portions comprising the first language and portions comprising the second language;

performing at least one of text and prosody analysis on the portions comprising the first language with a first language dependent module and performing at least one of text and prosody analysis on the portions comprising the second language with a second language dependent module;

receiving outputs from the first and second language dependent modules;

performing prosodic and phonetic context analysis over the outputs together based on a position in the sentence of each portion relative to the other portions and generating an output sentence;

selecting speech units from the database corresponding to the output sentence; and concatenating the selected speech units to form an utterance of the output sentence.

11. The method of claim 10 and further comprising normalizing the input text.

12. The method of claim 10 wherein identifying portions comprises associating identifiers to each of the portions.

13. The method of claim 12 and further comprising forwarding portions to the first language dependent module and the second language dependent module as a function of identifiers associated with the portions.

14. The method of claim 10 and further comprising identifying portions of the text as a function of order in the text.

15. The method of claim 10 wherein performing prosodic and phonetic context analysis comprises outputting a symbolic description of prosody for the multi-lingual text.

16. The method of claim 10 wherein performing prosodic and phonetic context analysis comprises outputting a numerical description of prosody for the multi-lingual text.

17. A computer readable storage media having instructions stored thereon, that when executed by a processor, perform speech synthesis, the instructions comprising:

a database having sampled speech units of a first language and of a second language;

a text processing module including:

a first language dependent module for performing at least one of text and prosody analysis on a first portion of input text from a sentence comprising the first language;

a second language dependent module for performing at least one of text and prosody analysis on a second portion of input text from the sentence comprising a second language;

a third module adapted to receive outputs from the first and second language dependent modules and perform prosodic and phonetic context modification over the outputs based on an intonation for the sentence using a combination of the first portion and the second portion of input text; and a speech unit concatenation and synthesis module adapted to receive an output from the third module, select speech units from the database corresponding to the output from the third module, concatenate the selected speech units to form an utterance of the output from the third module, and generate synthesized speech waveforms of the utterance.

18. The computer readable media claim of 17 wherein the third module provides a symbolic description of prosody for the output and wherein the synthesis module comprises a concatenation module.

19. The computer readable media claim of 17 wherein the third module provides a numeric description of prosody for the output and wherein the synthesis module comprises a generation module.

20. The computer readable media claim of 17 and further comprising a text normalization module for normalizing text for processing by the first language dependent module and the second language dependent module.

21. The computer readable media of claim 17 and further comprising a language identifier module adapted to receive multi-lingual text and associate identifiers for portions comprising the first language and for portions comprising the second language.

22. The computer readable media of claim 21 and further comprising an integrator module adapted to receive outputs from each module and forward said outputs for processing to another module as appropriate.

23. The computer readable media of claim 22 wherein the integrator forwards said outputs to the first language dependent module and the second language dependent module as a function of associated identifiers.

* * * * *

UNITED STATES PATENT AND TRADEMARK OFFICE

CERTIFICATE OF CORRECTION

PATENT NO. : 7,496,498 B2
APPLICATION NO. : 10/396944
DATED : February 24, 2009
INVENTOR(S) : Min Chu et al.

It is certified that error appears in the above-identified patent and that said Letters Patent is hereby corrected as shown below:

In column 10, line 41, in Claim 17, delete “a” and insert -- the --, therefor.

Signed and Sealed this
Twelfth Day of July, 2011

David J. Kappos

David J. Kappos
*Director of the United States Patent and Trademark Office*